(12) United States Patent
Yen

(10) Patent No.: US 8,863,620 B2
(45) Date of Patent: Oct. 21, 2014

(54) HAND TOOL WITH STRIPPING AND SHEARING FUNCTIONS

(76) Inventor: Chao-Chin Yen, New Taipei (TW)

(*) Notice: Subject to any disclaimer, the term of this patent is extended or adjusted under 35 U.S.C. 154(b) by 293 days.

(21) Appl. No.: 13/552,650

(22) Filed: Jul. 19, 2012

(65) Prior Publication Data

US 2014/0020513 A1    Jan. 23, 2014

(51) Int. Cl.
*H02G 1/12* (2006.01)

(52) U.S. Cl.
CPC ........... *H02G 1/1212* (2013.01); *H02G 1/1273* (2013.01)
USPC .............................................. 81/9.41; 81/9.42

(58) Field of Classification Search
CPC ... H02G 1/005; H02G 1/1202; H02G 1/1209; H02G 1/1212; H02G 1/1273
USPC .......................................... 81/9.4, 9.41–9.43
See application file for complete search history.

(56) References Cited

U.S. PATENT DOCUMENTS

| | | | | |
|---|---|---|---|---|
| 3,125,909 A * | 3/1964 | Hindengurg | .................... | 81/9.42 |
| 3,731,561 A * | 5/1973 | Mongredien | .................. | 81/9.42 |
| 4,703,674 A * | 11/1987 | Chen et al. | ..................... | 81/9.42 |
| 7,096,760 B2 * | 8/2006 | Schmode et al. | .............. | 81/9.41 |
| 2010/0024604 A1 * | 2/2010 | Nelson | .............................. | 81/9.4 |

* cited by examiner

*Primary Examiner* — Hadi Shakeri
(74) *Attorney, Agent, or Firm* — Chun-Ming Shih; HDLS IPR Services

(57) ABSTRACT

A hand tool with stripping and shearing functions includes a base, a handle set, a clamping element, an engaging blade set, a link rod set and a shearing blade set. The base includes a first body and a second body, and the first body has a first jaw section, and the second body has a second jaw section. The clamping element is corresponsive to the first jaw section. The engaging blade set is corresponsive to the second jaw section. The link rod set is pivotally coupled to the handle set, the clamping element, and the engaging blade set. The shearing blade set is coupled to a first knife body of the first body and a second knife body of the second body.

6 Claims, 12 Drawing Sheets

HAND TOOL WITH STRIPPING AND SHEARING FUNCTIONS

FIELD OF THE INVENTION

The present invention relates to a hand tool, in particular to the hand tool with both stripping and shearing functions.

BACKGROUND OF THE INVENTION

In general, a conventional long nose plier type wire stripper has a set of extended components pivotally coupled by a pivot pin, so that the wire stripper can perform pivoting actions, and the pivoting pin defines the portion below the pin as the handle of the wire stripper and the portion above the pin as the jaw of the wire stripper, and the jaw usually has a wire cutter and a group of aligned semicircular grooves in different sizes for stripping an insulation jacket of an electric wire.

However, the aforementioned long nose plier type wire stripper requires scissors to cut an insulation layer after a stripping process takes place, or cut a conductive wire whenever the stripping fails, so that when a user uses the wire stripper, the user generally requires using the scissors and has to carry and operate both hand tools for the purpose of stripping and shearing operations. Obviously, such conventional wire stripper is inconvenient for its carry and operation, and it is a main subject of the present invention to overcome the aforementioned problem.

SUMMARY OF THE INVENTION

Therefore, it is a primary objective of the present invention to provide a hand tool with both stripping and shearing functions to improve the convenience for users to carry and operate the hand tool.

To achieve the aforementioned objective, the present invention provides a hand tool with stripping and shearing functions, comprising:

- a base, including a first body and a second body symmetrically disposed with respect to each other, and the first body having a first jaw section, and the second body having corresponding to the first jaw section a second jaw section;
- a handle set, including a first handle and a second handle symmetrically disposed with respect to each other, and the first handle, the second handle, the first body and the second body being jointly and pivotally coupled;
- a clamping element, disposed at a position corresponding to the first jaw section;
- an engaging blade set, including a fixed blade and a movable blade disposed on both sides of the second jaw section respectively;
- a link rod set, including a first link rod and a second link rod, and both ends of the first link rod being respectively and pivotally coupled to the first handle and the clamping element, and both ends of the second link rod being respectively and pivotally coupled to the second handle and the movable blade; and
- a shearing blade set, including a first knife body coupled to the first handle and a second knife body coupled to the second handle, and the first knife body and the second knife body forming a cut opening.

In the hand tool with stripping and shearing functions of the present invention, the shearing blade set further includes a first knife body coupled to the first body and a second knife body coupled to the second body. When the first body and the second body approach one another, the first knife body and the second knife body are movably interlocked to form a cut opening.

DESCRIPTION OF THE PREFERRED EMBODIMENTS

The technical contents of the present invention will become apparent with the detailed description of preferred embodiments accompanied with the illustration of related drawings as follows.

Figure 1:
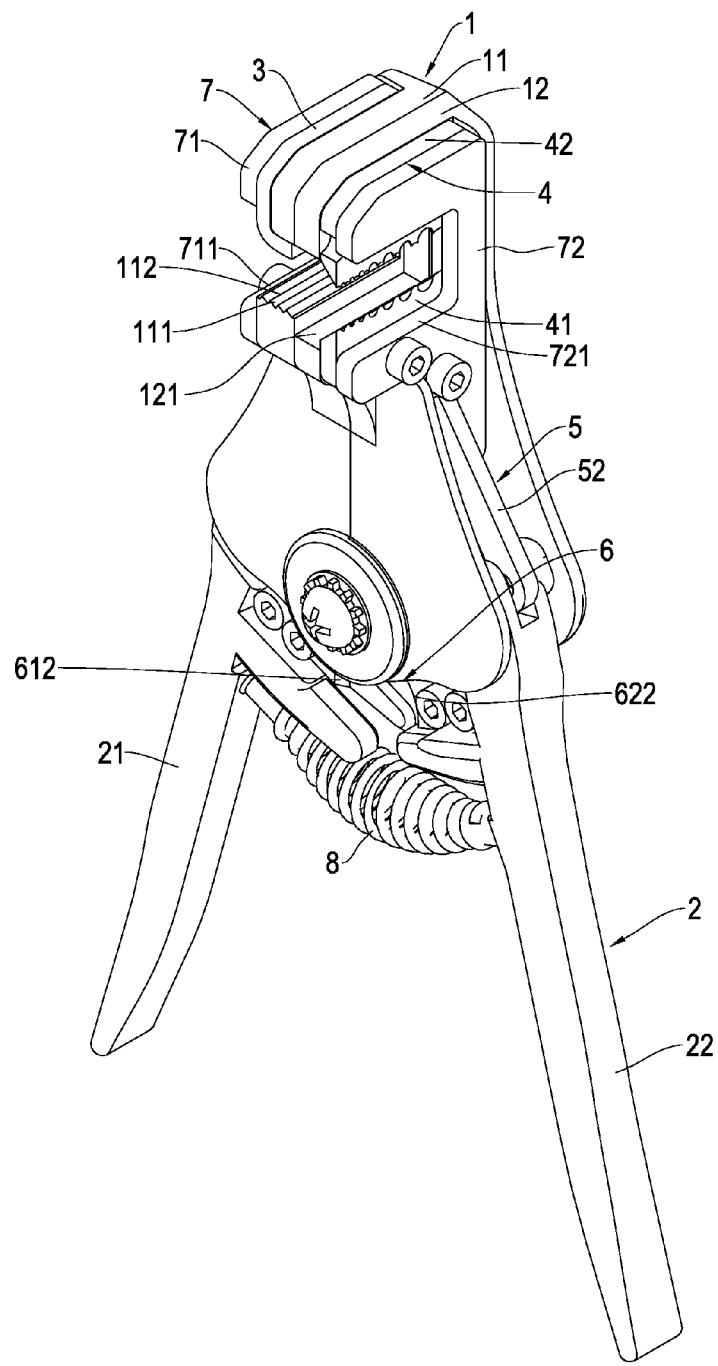
FIG. 1 is a perspective view of a hand tool of the present invention.
Figure 2:
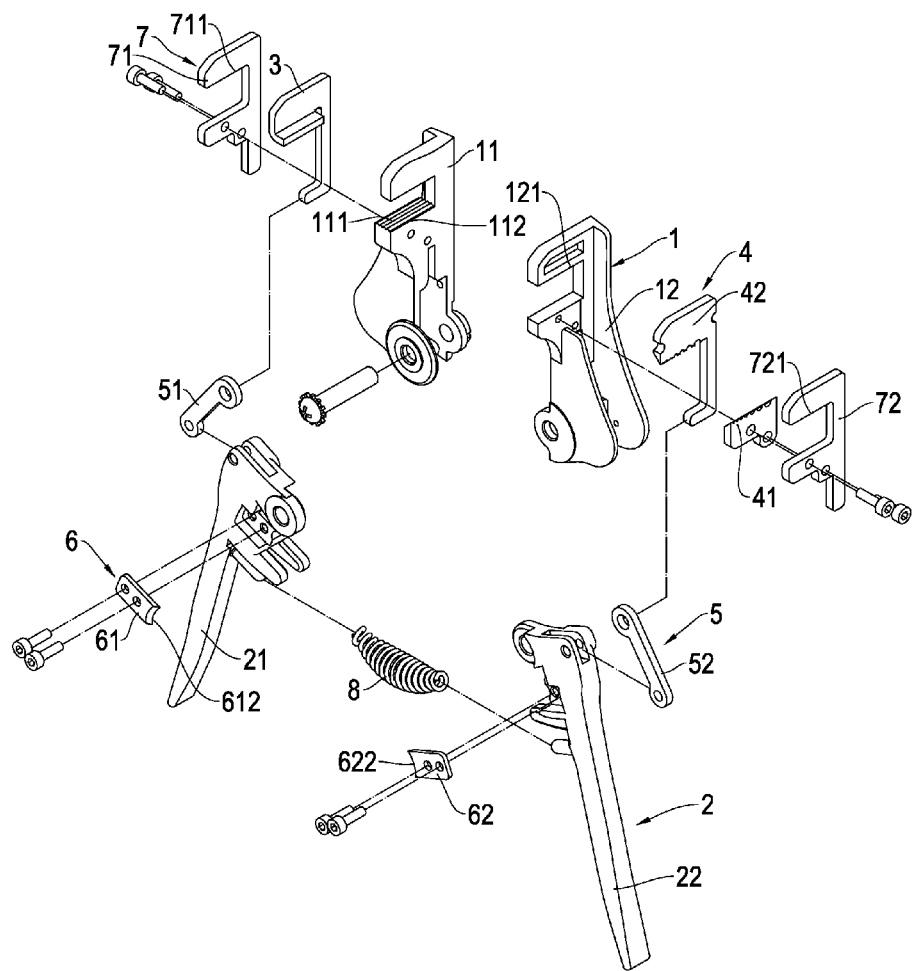
FIG. 2 is an exploded view of a hand tool of the present invention.

With reference to FIGS. 1 and 2, the present invention provides a hand tool with stripping and shearing functions, the hand tool comprises a base 1, a handle set 2, a clamping element 3, an engaging blade set 4, a link rod set 5 and a shearing blade set 6.

The base 1 includes a first body 11 and a second body 12 symmetrically disposed with respect to each other, and the first body 11 has a first jaw section 111, and the second body 12 has a second jaw section 121 corresponding to the first jaw section 111, and the first jaw section 111 has a surface 112 which is a serrated surface 112.

The handle set 2 includes a first handle 21 and a second handle 22 symmetrically disposed with respect to each other, and the first handle 21, and the second handle 22, the first body 11 and the second body 12 are jointly and pivotally coupled.

The clamping element 3 is installed at a position corresponding to the first jaw section 111. More specifically, the serrated surface 112 of the first jaw section 111 is disposed opposite to the clamping element 3.

The engaging blade set 4 includes a fixed blade 41 and a movable blade 42, and the fixed blade 41 and the movable blade 42 are installed on both sides of the second jaw section 121 respectively.

The link rod set 5 includes a first link rod 51 and a second link rod 52, and both ends of the first link rod 51 are respectively and pivotally coupled to the first handle 21 and the clamping element 3, and both ends of the second link rod 52 are respectively and pivotally coupled to the second handle 22 and the movable blade 42, so that when the first handle 21 and the second handle 22 approach one another, the clamping element 3 is driven by the first link rod 51 to approach the surface 112, and the movable blade 42 is driven by the second link rod 52 to approach the fixed blade 41.

The shearing blade set 6 includes a first knife body 61 coupled to the first handle 21 and a second knife body 62 coupled to the second handle 22, and the first knife body 61 and the second knife body 62 form a cut opening 63. More specifically, a first blade 612 is formed at an end of the first knife body 61, and a second blade 622 is formed at an end of the second knife body 62, and the first blade 612 and the second blade 622 form a cut opening 63.

The hand tool of the present invention further comprises a cover plate set 7, and the cover plate set 7 includes a first cover plate 71 and a second cover plate 72, wherein the first cover plate 71 is fixed to the first body 11 and covers the clamping element 3, so that the clamping element 3 is driven by the first link rod 51 to move between the first cover plate 71 and the first body 11; and the second cover plate 72 is fixed to the second body 12 and covers the engaging blade set 4, so that the movable blade 42 is driven by the second link rod 52 to move between the second cover plate 72 and the second body 12. Wherein, the first cover plate 71 has a first cutaway groove 711 formed at a position corresponding to the first jaw section 111; and the second cover plate 72 has a second cutaway groove 721 formed at a position corresponding to the second jaw section 121.

The hand tool of the present invention further comprises a restoring spring 8 with an end coupled to the first handle 21 and the other end coupled to the second handle 22, so that the first handle 21 and the second handle 22 will be spread apart when no force is exerted thereon.

In the assembly of the hand tool with stripping and shearing functions according to the present invention, the base 1 includes a first body 11 and a second body 12 symmetrically disposed with respect to each other, and the first body 11 has a first jaw section 111, and the second body 12 has a second jaw section 121 corresponding to the first jaw section 111, and the first jaw section 111 has a surface 112 which is a serrated surface 112.

The handle set 2 includes a first handle 21 and a second handle 22 symmetrically disposed with respect to each other, and the first handle 21, the second handle 22, the first body 11 and the second body 12 are jointly and pivotally coupled. The clamping element 3 is installed at a position corresponding to the first jaw section 111. The engaging blade set 4 includes a fixed blade 41 and a movable blade 42 installed on both sides of the second jaw section 121 respectively. The link rod set 5 includes a first link rod 51 and a second link rod 52, and both ends of the first link rod 51 are respectively and pivotally coupled to the first handle 21 and the clamping element 3, and both ends of the second link rod 52 are respectively and pivotally coupled to the second handle 22 and the movable blade 42. The shearing blade set 6 includes a first knife body 61 coupled to the first handle 21 and a second knife body 62 coupled to the second handle 22, and the first knife body 61 and the second knife body 62 form a cut opening 63. Therefore, the hand tool can provide both stripping and shearing functions at the same time and improve the convenience of carrying and operating the hand tool.

Figure 3:
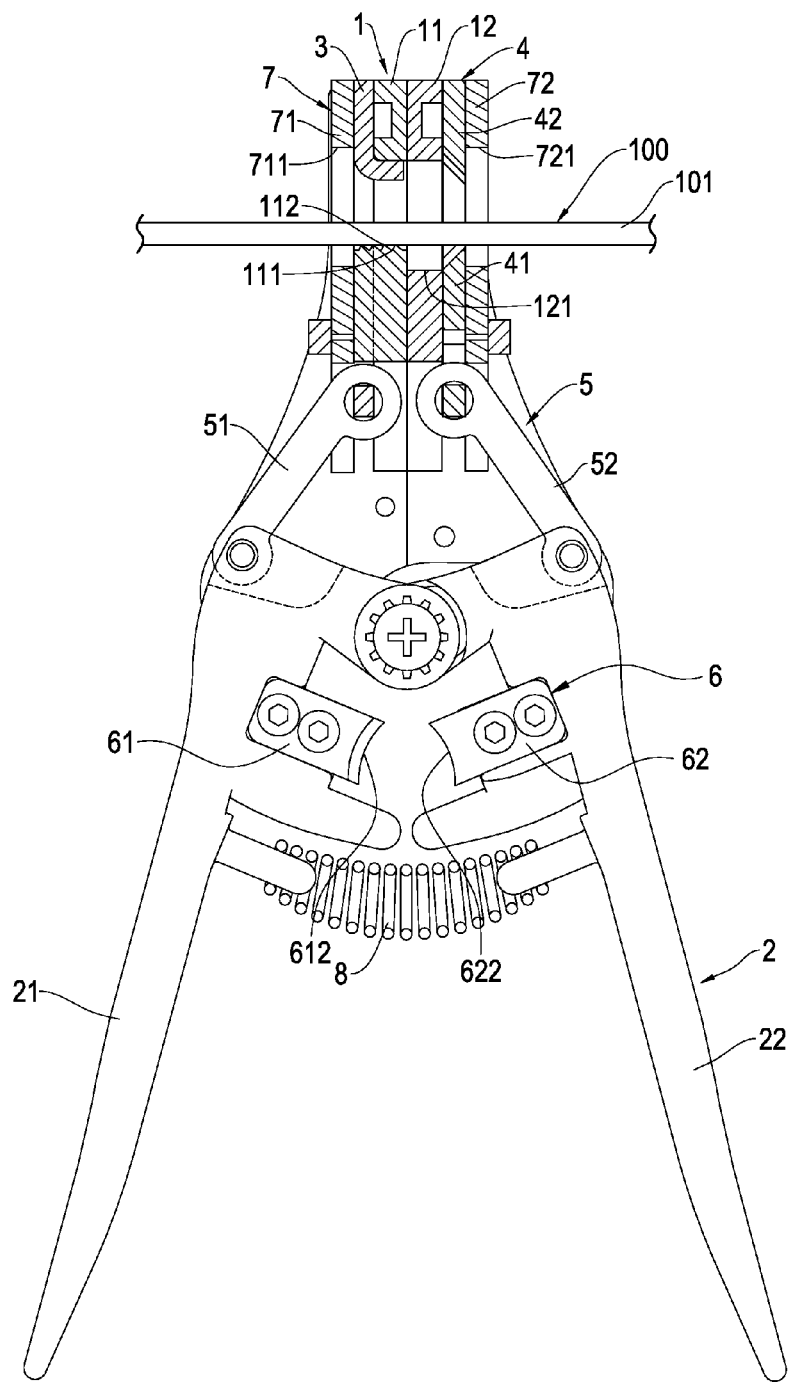
FIG. 3 is a schematic view showing a status of stripping an electric wire by a hand tool of the present invention.
Figure 4:
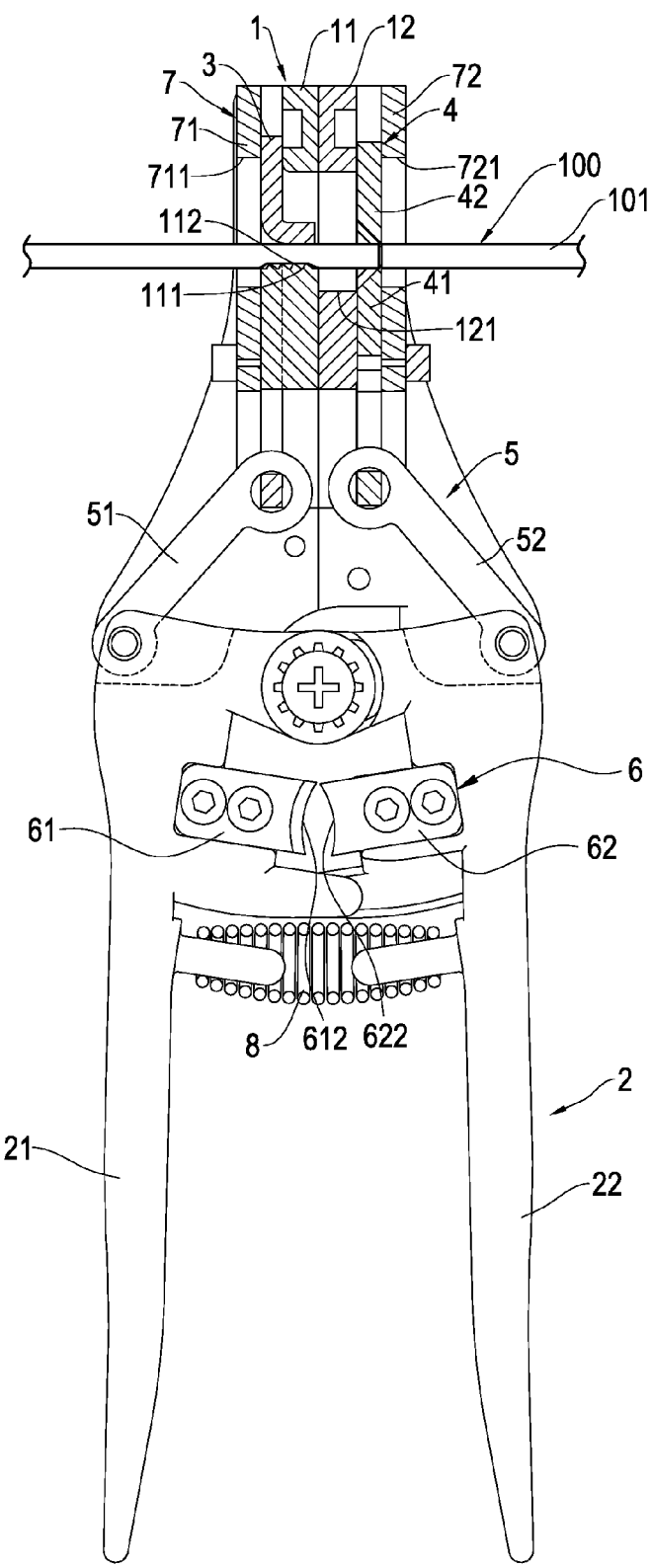
FIG. 4 is a schematic view showing another status of stripping an electric wire by a hand tool of the present invention.
Figure 5:
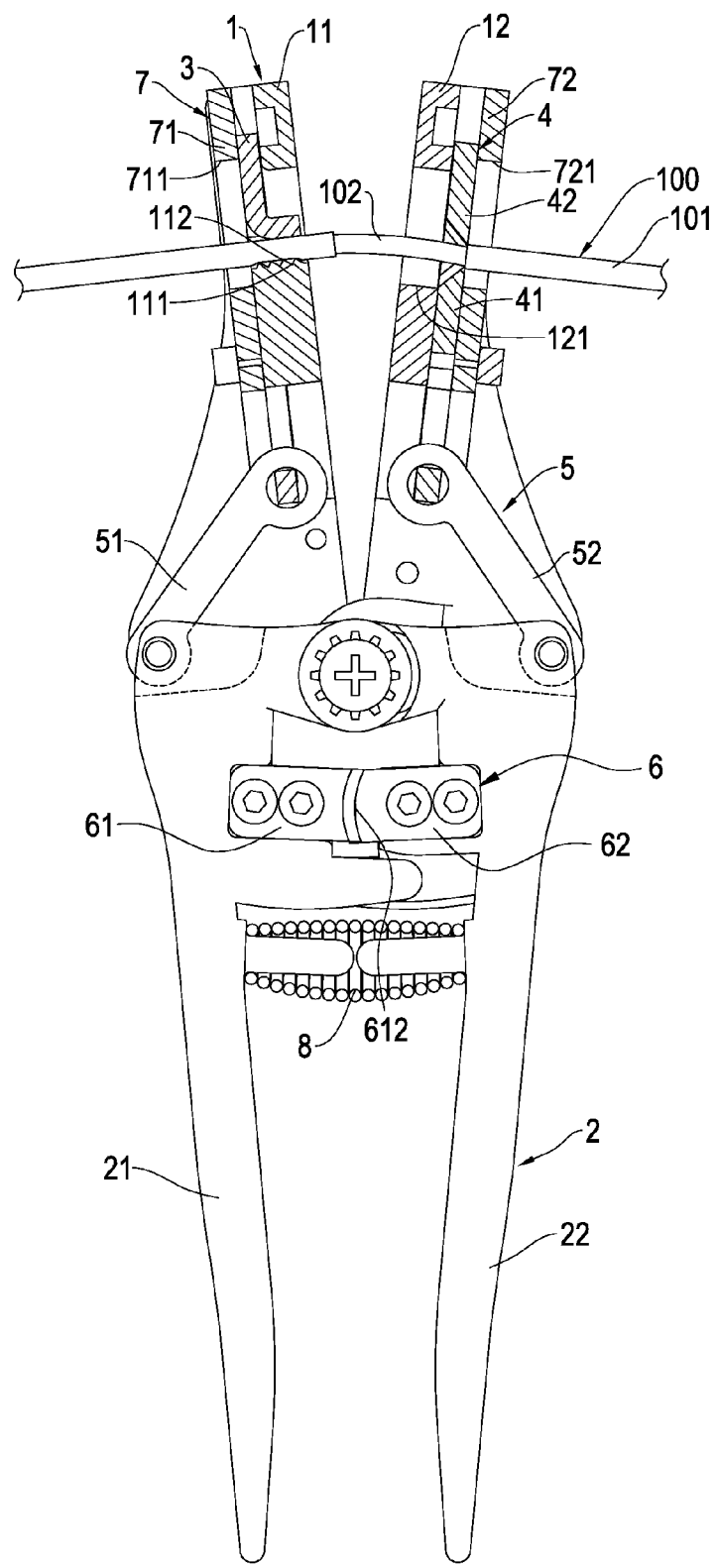
FIG. 5 is a schematic view showing a further status of stripping an electric wire by a hand tool of the present invention.

With reference to FIGS. 3 to 5 for the statuses of stripping an electric wire by a hand tool in accordance with the present invention respectively, the conductive wire 100 is placed into the first jaw section 111 and the second jaw section 121. When the first handle 21 and the second handle 22 approach one another, the clamping element 3 is driven by the first link rod 51 to approach the surface 112, and the movable blade 42 is driven by the second link rod 52 to approach the fixed blade 41, so that the first jaw section 111 and the surface 112 jointly clamp the conductive wire 100. Now, the engaging blade set 4 is restricted by the first jaw section 111 and the clamping element 3 to form a gap between the fixed blade 41 and the movable blade 42, so that the engaging blade set 4 can be engaged with an insulation layer 101 of the conductive wire 100 to avoid cutting the core wire 102. When the first handle 21 and the second handle 22 approach one another, the first body 11 and the second body 12 are spread apart, and the insulation layer 101 is swept aside to be exposed from the core wire 102.

Figure 6:
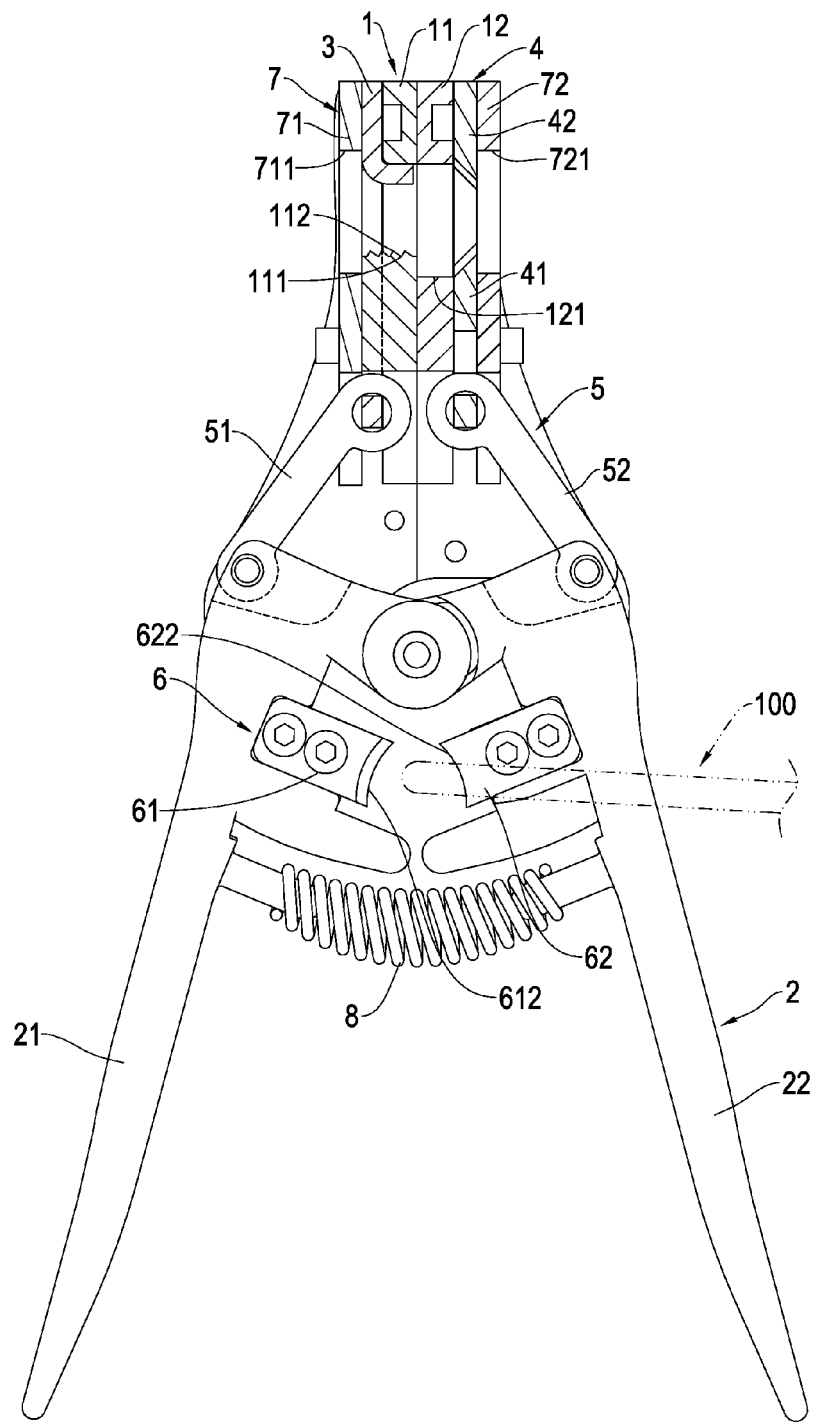
FIG. 6 is a schematic view showing a status of shearing an electric wire by a hand tool of the present invention.
Figure 7:
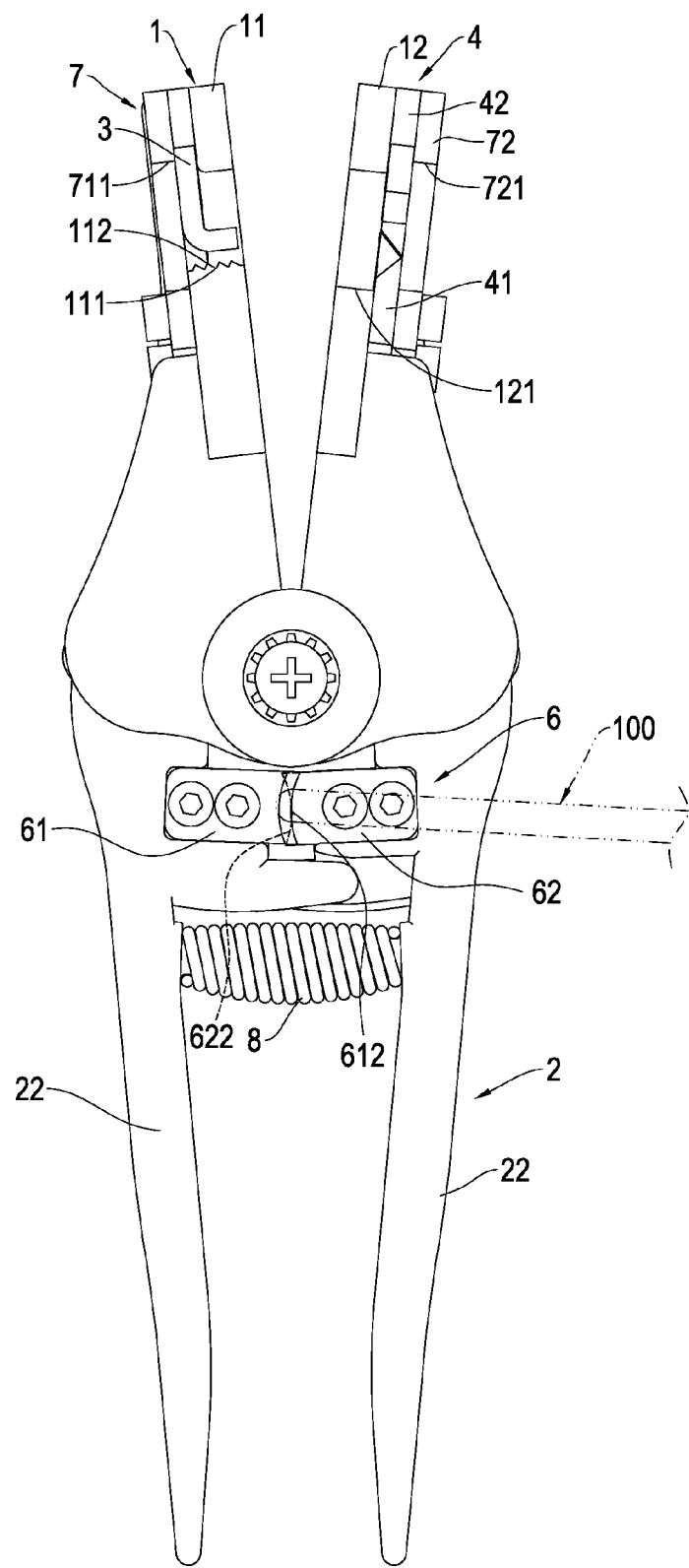
FIG. 7 is a schematic view showing another status of shearing an electric wire by a hand tool of the present invention.
Figure 8:
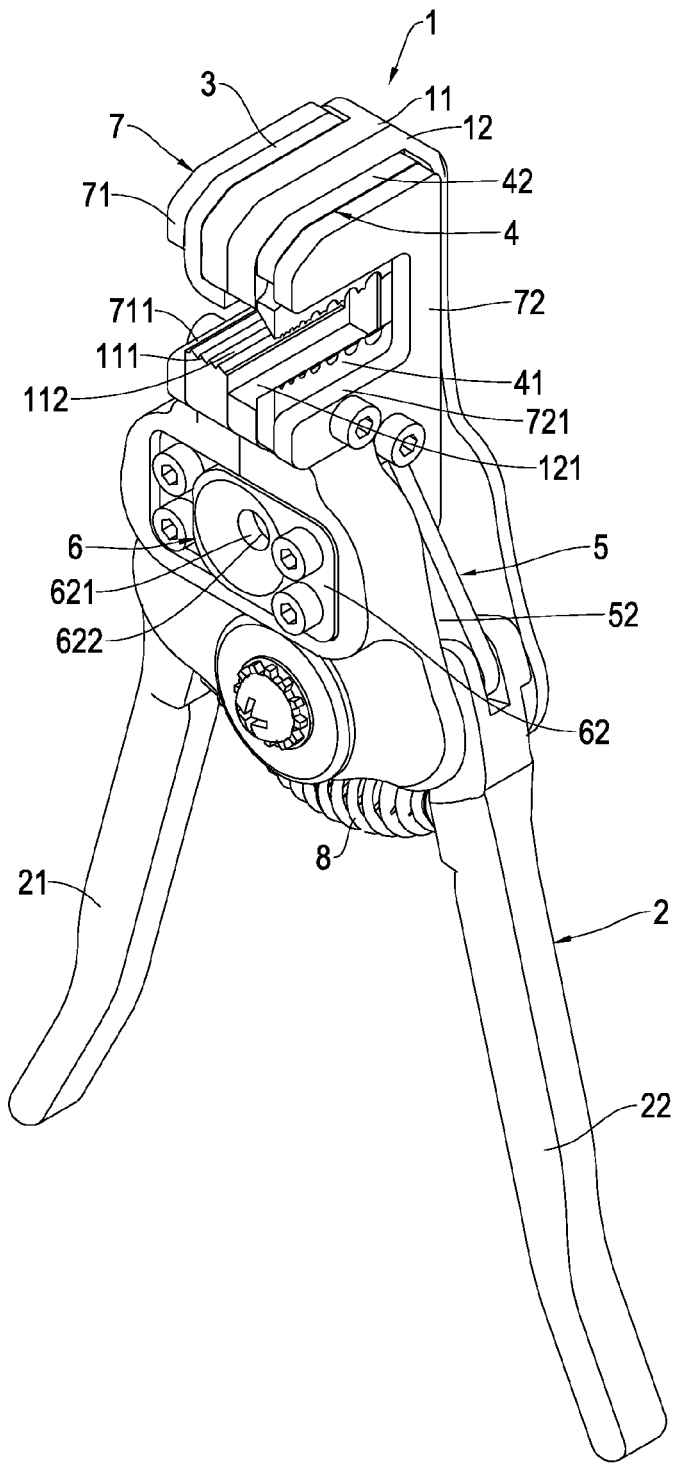
FIG. 8 is a perspective view of another preferred embodiment of the present invention.
Figure 9:
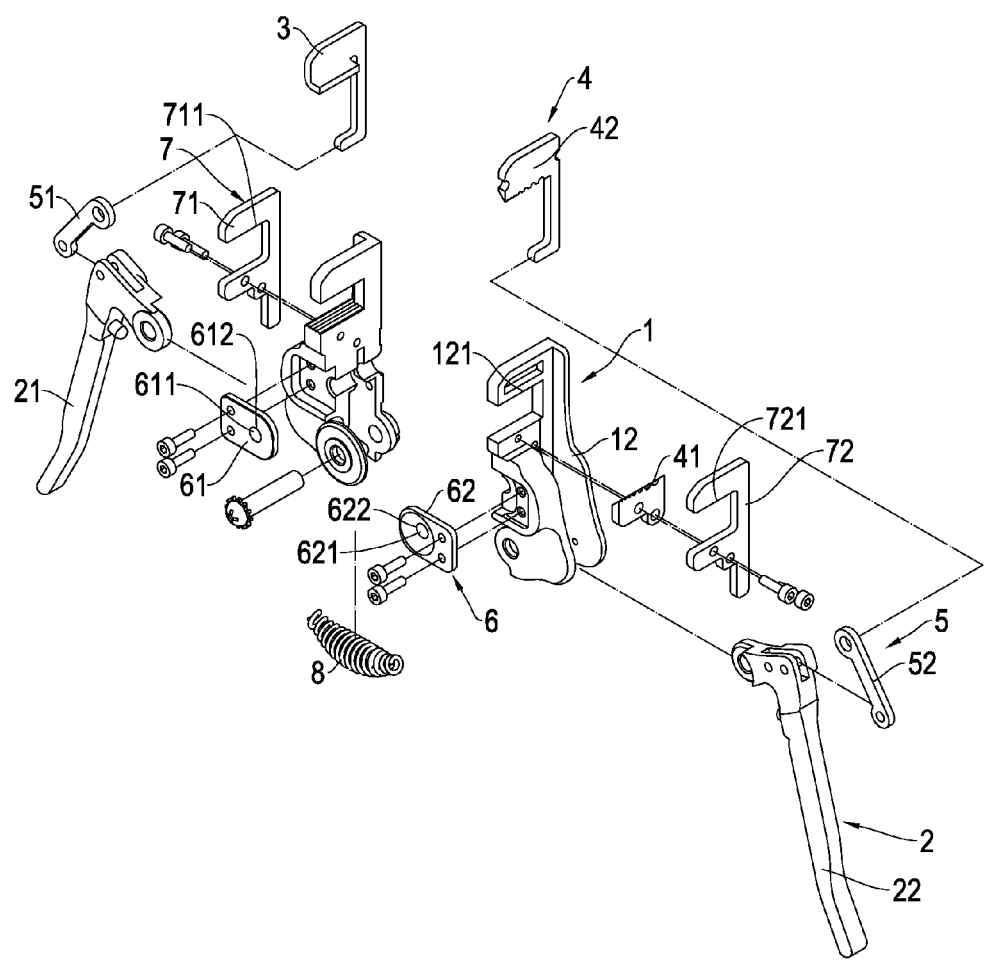
FIG. 9 is an exploded view of another preferred embodiment of the present invention.
Figure 10:
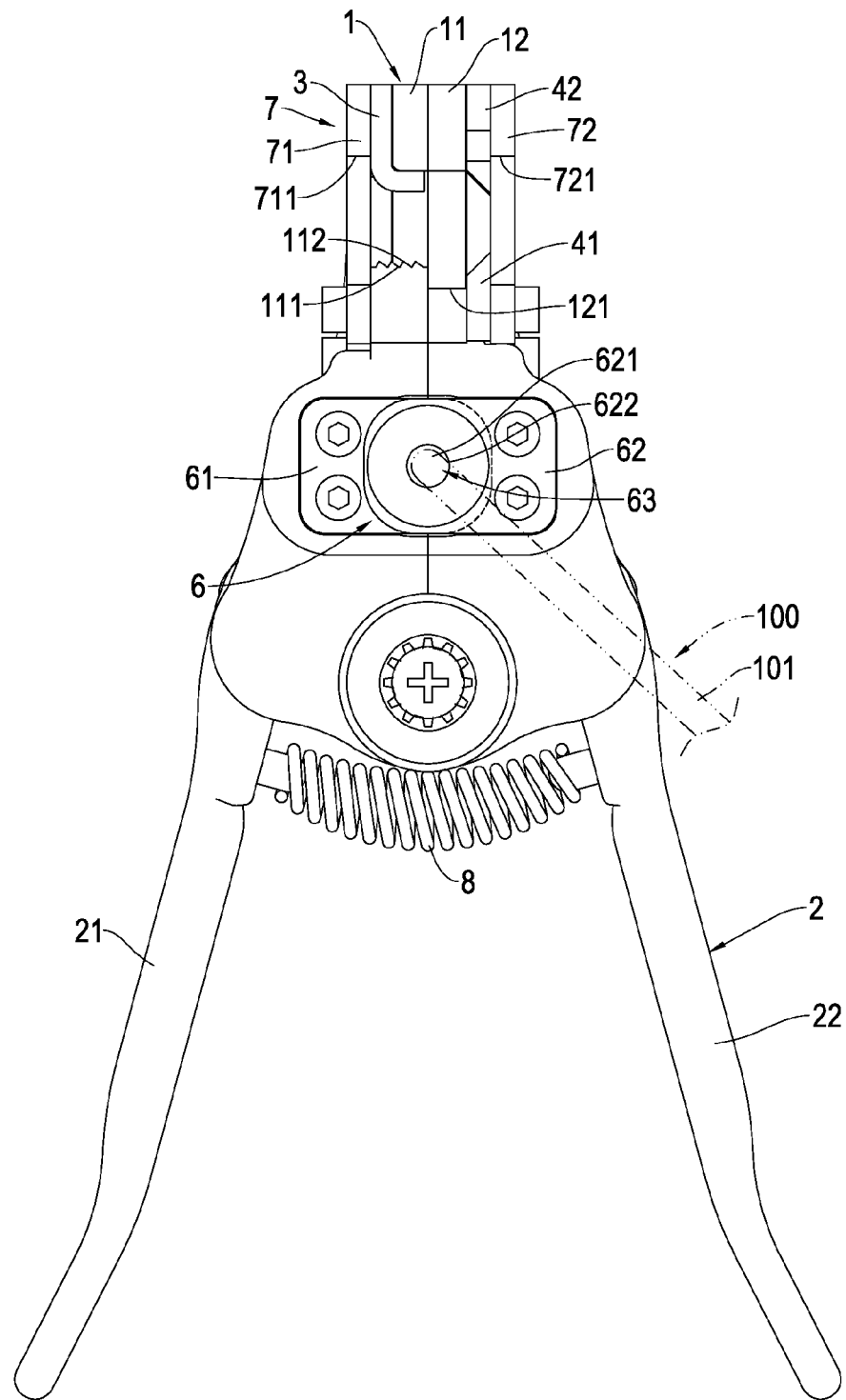
FIG. 10 is a schematic view showing a status of shearing an electric wire by a hand tool in accordance with another preferred embodiment of the present invention.
Figure 11:
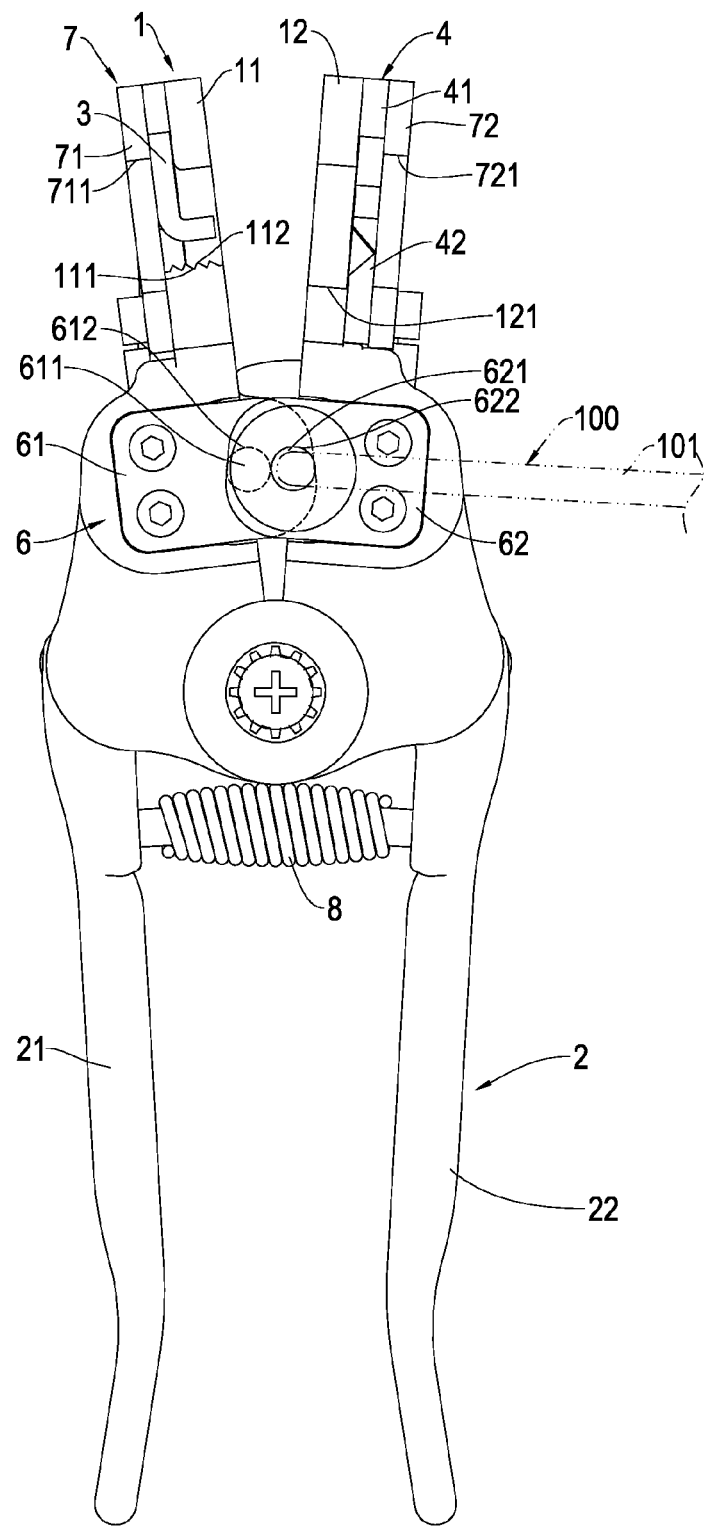
FIG. 11 is a schematic view showing another status of shearing an electric wire by a hand tool in accordance with another preferred embodiment of the present invention.

With reference to FIGS. 6 and 7 for the statuses of shearing an electric wire by a hand tool of the present invention respectively, a gap is formed between the first knife body 61 and the second knife body 62 when no force is exerted onto the first handle 21 and the second handle 22, so that the first blade 612 and the second blade 622 form a cut opening 63 for putting the conductive wire 100 therein. When the first handle 21 and the second handle 22 approach one another, the first knife body 61 and the second knife body 62 become increasingly closer with each other and drive the first blade 612 and the second blade 622 to be interlocked to shear the conductive wire 100. Therefore, the hand tool of the present invention has both stripping and shearing functions at the same time, and users no longer need to carry both hand tools including the wire stripper and the scissors at the same time and improve the convenience of carrying and operating the hand tool.

With reference to FIGS. 8 to 11 for a hand tool in accordance with another objective of the present invention, the shearing blade set 6 is fixed to a side of the base 1 proximate to the handle set 2. More specifically, the shearing blade set 6 includes the first knife body 61 and the second knife body 62, and the shearing blade set 6 is installed under the first jaw section 111 and the second jaw section 121.

In addition, when the first body 11 and the second body 12 approach each other, the first knife body 61 and the second knife body 62 can be movably interlocked to form a cut opening 63. More specifically, the first knife body 61 has a first penetrating hole 611 and a first blade 612 formed in the first penetrating hole 611, and the second knife body 62 has a second penetrating hole 621 and a second blade 622 formed in the second penetrating hole 621, and the first penetrating hole 611 and the second penetrating hole 621 can be movably interlocked to form a cut opening 63.

In a using status of this preferred embodiment, the first body 11 and the second body 12 are attached closely with each other, when no force is exerted onto the first handle 21 and the second handle 22, the first knife body 61 and the second knife body 62 are stacked and interlocked to form a cut opening 63 for putting the conductive wire 100 therein. When the first handle 21 and the second handle 22 approach each other, the first body 11 and the second body 12 are spread apart to drive the first knife body 61 and the second knife body 62 to separate from one another, so that the first blade 612 and the second blade 622 can be interlocked to shear the conductive wire 100. Therefore, the hand tool of the present invention can have both stripping and shearing functions at the same time and improve the convenience of carrying and operating the hand tool.

Figure 12:
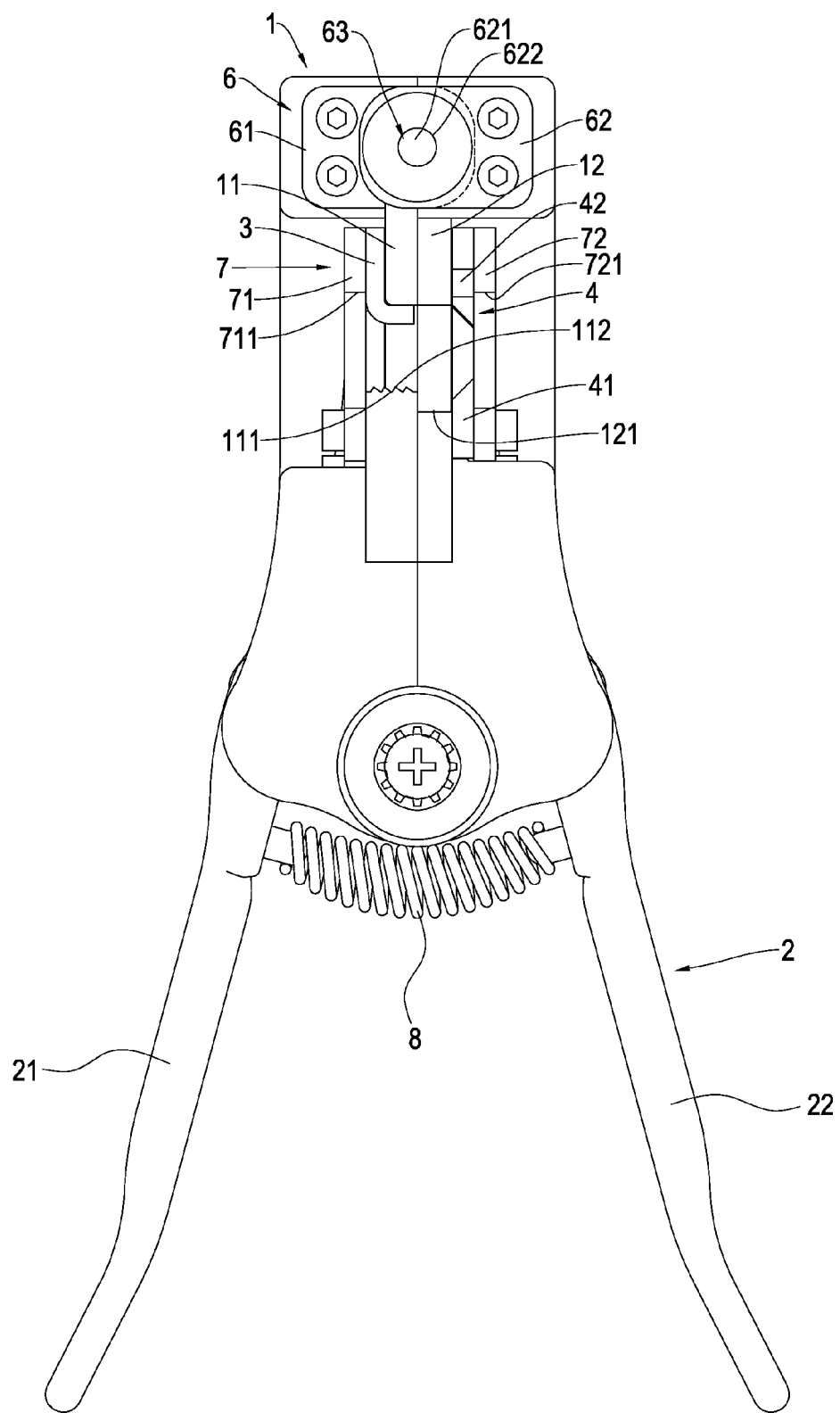
FIG. 12 is a perspective view of a hand tool in accordance with a further preferred embodiment of the present invention.

With reference to FIG. 12 for a hand tool in accordance with a further preferred embodiment of the present invention as well as FIGS. 8 to 11, the shearing blade set 6 of this preferred embodiment is also fixed to a side of the base 1 away from the handle set 2. More specifically, the shearing blade set 6 is installed above the first jaw section 111 and the second jaw section 121, so as to achieve the aforementioned functions and effects.

In summation of the description above, the hand tool with stripping and shearing functions of the present invention achieves the expected objectives and overcomes the drawbacks of the prior art as well as complying with the patent application requirements, and thus is duly filed for patent application. While the invention has been described by means of specific embodiments, numerous modifications and variations could be made thereto by those skilled in the art without departing from the scope and spirit of the invention set forth in the claims.

What is claimed is:

1. A hand tool with stripping and shearing functions, comprising:
    a base, including a first body and a second body symmetrically disposed with respect to each other, and the first body having a first jaw section, and the second body having a second jaw section corresponding to the first jaw section;
    a handle set, including a first handle and a second handle symmetrically disposed with respect to each other, and the first handle, the second handle, the first body and the second body being jointly and pivotally coupled;
    a clamping element, disposed at a position corresponding to the first jaw section;
    an engaging blade set, including a fixed blade and a movable blade disposed on both sides of the second jaw section respectively;
    a link rod set, including a first link rod and a second link rod, and both ends of the first link rod being respectively and pivotally coupled to the first handle and the clamping element, and both ends of the second link rod being respectively and pivotally coupled to the second handle and the movable blade; and
    a shearing blade set, including a first knife body coupled to the first body and a second knife body coupled to the second body, and when the first body and the second body are attached to each other, the first knife body and the second knife body are movably interlocked to form a cut opening,
    wherein the first knife body has a first penetrating hole, and the first penetrating hole has a first blade formed therein, and the second knife body has a second penetrating hole, and the second penetrating hole has a second blade formed therein, and the first penetrating hole and the second penetrating hole are movably interlocked to form the cut opening.

2. The hand tool with stripping and shearing functions according to claim 1, further comprising a cover plate set, and the cover plate set including a first cover plate and a second cover plate, and the first cover plate being fixed to the first body and covering the clamping element, and the second cover plate being fixed to the second body and covering the engaging blade set.

3. The hand tool with stripping and shearing functions according to claim 2, wherein the first cover plate has a first cutaway groove disposed at a position corresponding to the first jaw section, and the second cover plate has a second cutaway groove disposed at a position corresponding to the second jaw section.

4. The hand tool with stripping and shearing functions according to claim 1, further comprising a restoring spring with an end coupled to the first handle and the other end coupled to the second handle.

5. The hand tool with stripping and shearing functions according to claim 1, wherein the shearing blade set is fixed to a side of the base away from the handle set.

6. The hand tool with stripping and shearing functions according to claim 1, wherein the shearing blade set is fixed to a side of the base proximate to the handle set.

\* \* \* \* \*